United States Patent
Purushotham et al.

(10) Patent No.: US 10,831,659 B2
(45) Date of Patent: Nov. 10, 2020

(54) SCOPE RESOLUTION TAG BUFFER TO REDUCE CACHE MISS LATENCY

(71) Applicant: International Business Machines Corporation, Armonk, NY (US)

(72) Inventors: Srinivas B. Purushotham, Bangalore (IN); Naveen Miriyalu, Bangalore (IN); Venkata K. Tavva, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/146,687

(22) Filed: Sep. 28, 2018

(65) Prior Publication Data
US 2020/0104258 A1    Apr. 2, 2020

(51) Int. Cl.
*G06F 12/0811* (2016.01)
*G06F 12/0891* (2016.01)
*G06F 12/0895* (2016.01)
*G06F 12/0888* (2016.01)

(52) U.S. Cl.
CPC ...... *G06F 12/0811* (2013.01); *G06F 12/0888* (2013.01); *G06F 12/0891* (2013.01); *G06F 12/0895* (2013.01); *G06F 2212/1021* (2013.01)

(58) Field of Classification Search
CPC .................................................. G06F 12/00–16
See application file for complete search history.

(56) References Cited

U.S. PATENT DOCUMENTS

| 8,315,995 | B1 * | 11/2012 | Levy | G06F 3/0608 707/694 |
| 9,785,568 | B2 | 10/2017 | Vajapeyam | |
| 2006/0265552 | A1 | 11/2006 | Davis et al. | |
| 2009/0144492 | A1 * | 6/2009 | Barth | G06F 12/0893 711/106 |
| 2013/0019081 | A1 | 1/2013 | Moyer | |
| 2013/0111136 | A1 * | 5/2013 | Bell, Jr. | G06F 12/08 711/122 |

(Continued)

FOREIGN PATENT DOCUMENTS

CN    104750557    7/2015

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Nicholas J Simonetti
(74) *Attorney, Agent, or Firm* — Law Office of Jim Boice (57) ABSTRACT

A method handles cache misses using a Scope Resolution Tag Buffer (SRTB). A cache controller assigns each data block in L2 cache with an n-bit value, where the n-bit value describes a quantity of occurrences in which the data block has been accessed, and where the cache controller increments the n-bit value in one or more data blocks in the first level memory cache each time the one or more data blocks are accessed. The cache controller evicts a particular data block from the L2 cache, and stores a particular data block address where the particular data block is now stored in a Scope Resolution Tag Buffer (SRTB). The information in the SRTB is used to locate which cache or memory contains the particular data block in the event of a subsequent cache miss in the L2 cache.

20 Claims, 6 Drawing Sheets

(56) References Cited

U.S. PATENT DOCUMENTS

| | | |
|---|---|---|
| 2014/0223098 A1 | 8/2014 | Lee et al. |
| 2015/0293845 A1 | 10/2015 | Hsu et al. |
| 2016/0011979 A1* | 1/2016 | Islam ................. G06F 12/0871 711/102 |
| 2016/0210239 A1 | 7/2016 | Wang et al. |

OTHER PUBLICATIONS

S. Gupta et al., "Adaptive Cache Bypassing for Inclusive Last Level Caches", IEEE 27th International Symposium on Parallel and Distributed Processing, Boston, MA, May 2013, pp. 1-11.

* cited by examiner

SCOPE RESOLUTION TAG BUFFER TO REDUCE CACHE MISS LATENCY

BACKGROUND

The present invention relates to the field of computers, and particularly to cache memory in computers. Still more particularly, the present invention relates to handling cache misses in a computer.

SUMMARY

In one or more embodiments of the present invention, a method handles cache misses using a Scope Resolution Tag Buffer (SRTB). A cache controller assigns each data block in a first level memory cache with an n-bit value and metadata, where the n-bit value describes a quantity of occurrences in which the data block has been accessed, and where the cache controller increments the n-bit value in one or more data blocks in the first level memory cache each time the one or more data blocks are accessed. The cache controller initiates an eviction of a particular data block from the first level memory cache. In response to initiating the eviction of the particular data block from the first level memory cache, the cache controller reads the n-bit value for the particular data block, where the particular data block has a particular data block address. The cache controller determines that the n-bit value of the particular data block exceeds a predetermined value, and then: stores only the particular data block address and the metadata for the particular data block in a Scope Resolution Tag Buffer (SRTB); and stores the particular data block in a second level memory that is logically lower than the first level memory cache. The cache controller evicts the particular data block from the first level memory cache. Subsequently, the cache controller detects a cache miss in the first level memory cache for the particular data block. In response to detecting the cache miss in the first level memory cache for the particular data block, the cache controller retrieves a current location of the particular data block from the metadata stored in the SRTB for the particular data block, and then retrieves the particular data block from the current location of the particular data block.

In one or more embodiments, the method described above is implemented as a computer program product and/or a computer system.

DETAILED DESCRIPTION

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

Figure 1:
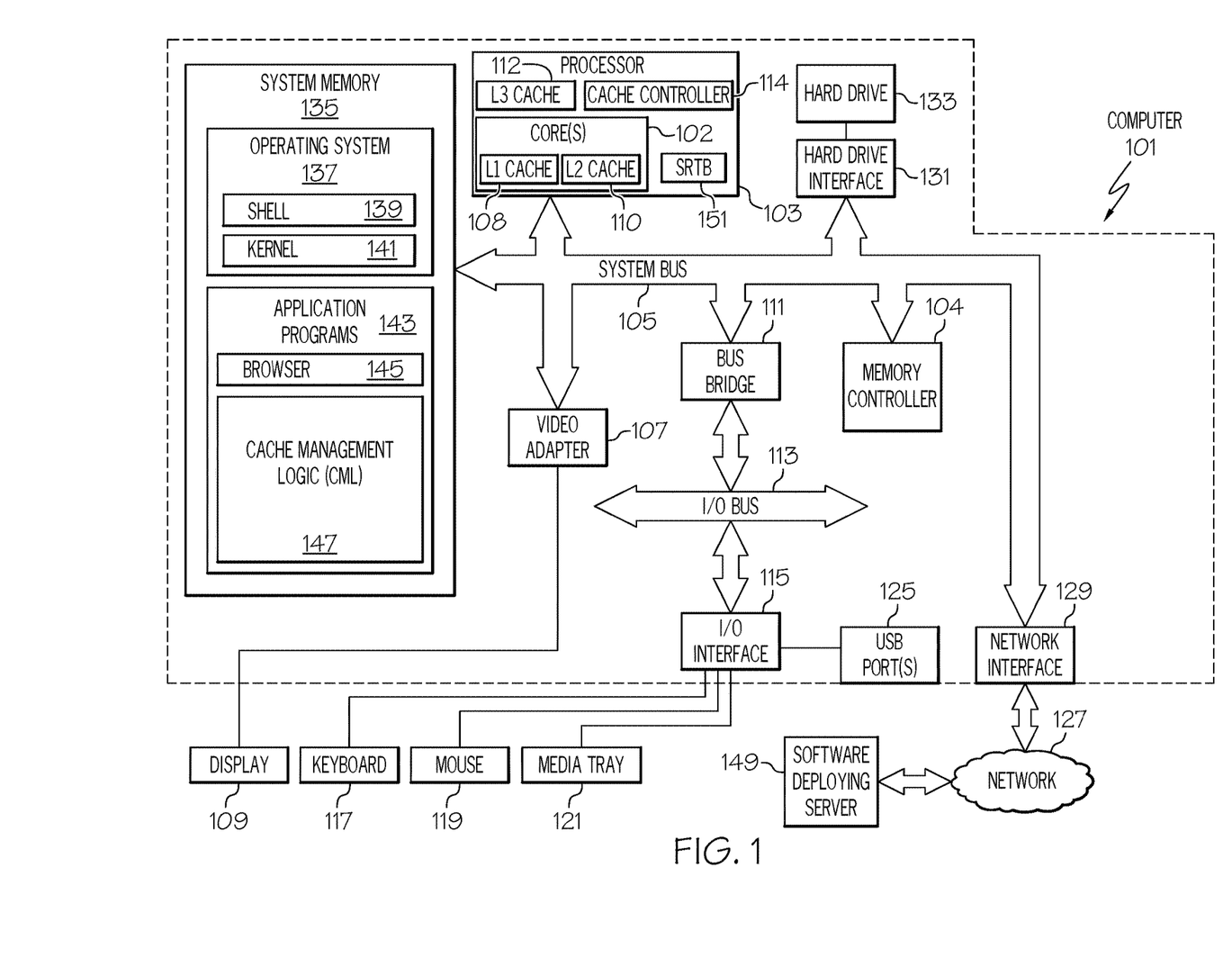
FIG. 1 depicts an exemplary system and network in which the present disclosure is implemented in one or more embodiments.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 is utilized by software deploying server 149 shown in FIG. 1.

In one or more embodiments of the present invention, exemplary computer 101 includes a processor 103 that is coupled to a system bus 105. Processor 103 utilizes one or more processors, each of which has one or more processor core(s) 102.

A memory controller 104 controls system memory 135 and hard drive 133, as well as various layers of cache memory (e.g., L1 cache 108 and L2 cache 110 within core(s) 102, as well as L3 cache 112 and L4 cache 106 that supports L1 cache 108 and L2 cache 110). That is, L1 cache 108 includes L1 instruction cache(s) and L1 data cache(s) that are used by execution units (not shown) within core(s) 102 to supply (respectively) instructions and data needed by the executions units (e.g., floating point execution units, fixed point execution units, load/store execution units, etc.) within the core(s) 102. The L1 cache 108 is supplied with instructions/data by L2 cache 110, which also within the core(s) 102. The L2 cache 110 is supplied with instructions/data by L3 cache 112, which is within processor 103, but is not within the core(s) 102. L4 cache 106 is outside of the processor 103 (e.g., on a dedicated dynamic random access memory—DRAM), but is communicatively coupled to the L3 cache 112 in order to supply instructions/data to the L3 cache 112.

Each level of cache is smaller than and faster than the next lower level of cache. That is, each higher level of cache (e.g., L1 cache is hierarchically higher than L2 cache) is able to supply data faster to the core(s) 102 due to their smaller sizes (making it faster to locate a specific block of instructions/data) and physical proximity to the core(s) 102. That is, L1 cache 108 is smaller than but faster than L2 cache 110, which is smaller than but faster than L3 cache 112, which is smaller than but faster than L4 cache 106, which is smaller than but faster than system memory 135.

In an embodiment of the present invention, a cache controller 114 controls the operation of the L1 cache 108, the L2 cache 110, and L3 cache 112. Cache controller 114 is faster than memory controller 104 when controlling the L1 cache 108, the L2 cache 110, and L3 cache 112 since the cache controller 114 is 1) physically closer to the L1 cache 108, the L2 cache 110, and L3 cache 112 than the memory controller 104, and 2) is dedicated to controlling the L1 cache 108, the L2 cache 110, and L3 cache 112. In a preferred embodiment, cache controller 114, like memory controller 104, is a dedicated hardware circuit that reads, writes, loads, and evicts blocks of data/instructions into certain caches.

Also associated with, and in one or more embodiments within, processor 103 is a Scope Resolution Tag Buffer (SRTB) 151, which is described in further detail below.

A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. The format of the ports connected to I/O interface 115 is that which is known to those skilled in the art of computer architecture, including but not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Cache Management Logic (CML) 147. CML 147 includes code for implementing the processes described below, including those described in FIGS. 2-4. In one embodiment, computer 101 is able to download CML 147 from software deploying server 149, including in an on-demand basis, wherein the code in CML 147 is not downloaded until needed for execution. In one embodiment of the present invention, software deploying server 149 performs all of the functions associated with the present invention (including execution of CML 147), thus freeing computer 101 from having to use its own internal computing resources to execute CML 147.

The hardware elements depicted in computer 101 are not intended to be exhaustive, but rather are representative to highlight essential components required by the present invention. For instance, in one or more embodiments computer 101 includes alternate memory storage devices such as magnetic cassettes, digital versatile disks (DVDs), Bernoulli cartridges, and the like. These and other variations are intended to be within the spirit and scope of the present invention.

As described above, modern processors employ multi-level cache hierarchy designs to reduce load latency and mitigate miss penalty of a cache miss. Thus, cache size and the placement of the cache in the hierarchy influence its access latency. As such, caches higher in the hierarchy are typically smaller and have faster access time (e.g., L2 cache is smaller and has faster access times than L3 cache).

Miss penalty proportionally increases if the load is satisfied by a cache lower in the memory hierarchy. That is, misses in the caches that are higher in the cache hierarchy (e.g., L1 cache and L2 cache) cause the system to retrieve data from caches that are lower in the cache hierarchy (e.g., L3 cache and L4 cache, and even system memory). Given that the miss penalty is high as the system uses more cache levels, the latency to fetch a block of data on a L1/L2 miss is very high.

In order to minimize cache misses in the higher levels of cache (e.g., L1 cache and L2 cache), the present invention 1) provides a novel approach for determining what data blocks are to be evicted from higher levels of cache (in order to make room for other data blocks), and 2) provides a novel approach for quickly locating where the evicted data blocks are located (e.g., L3 cache or L4 cache or system memory). The present invention allows the system to evict and locate certain blocks of data, even though they are "clean" (i.e., have not been altered after being stored in a location such as L2 cache).

As such, one or more embodiments of the present invention provide a mechanism to effectively cache heavily used data in the L3 cache, thus making utilization of L3 cache capacity and bandwidth. Furthermore, the present invention bypasses a L3 lookup (i.e., in which all data blocks currently in the L3 cache are examined to find a match for a data miss in the L2 cache). Rather, one or more embodiments of the present invention provide a mechanism to quickly determine (without use of an L3 lookup) where the data miss is located, in order to quickly retrieve it from a lower level of cache (or system memory), thus reducing miss latency and improving the operation of the processor/computer.

In one or more embodiments of the present invention, both clean and/or dirty blocks are stored in the lower levels of cache/memory. Thus, both the address and metadata of both clean and dirty blocks are stored in the Scope Resolution Tag Buffer (SRTB) described herein.

In one or more embodiments, the process of 1) determining what data blocks are to be evicted from higher levels of cache (in order to make room for other data blocks) is accomplished by determining how many times a particular block has been accessed. That is, it does not matter how recently or how frequently a certain block of data is accessed when deciding which block is evicted (e.g., from L2 cache). Rather, it is just the total number of times that a certain block of data is used that determines whether or not it is evicted from a cache such as L2 cache. In order to keep track of how often a particular block is accessed, an access count tag (e.g., between 2 and 4 bits long) is associated with each block and is incremented by one every time that block is accessed. For example, if the access count tag (count tag) has two bits, and the block associated with that access count tag has been accessed three times, then the access count tag has the value "11". Thereafter, if the same block is accessed addition time, the access count tag remains "saturated" at the value "11".

When a particular block is selected as a victim block (i.e., is chosen to be evicted from a particular cache, such as L2 cache), the access count tag for that selected victim block is read. If the value is higher than a predetermined level (e.g., "10" or "11" in the case of a 2-bit access count tag), indicating that this selected victim block has been used a frequent number of times, the address and metadata for that selected victim block is placed in a special buffer called the Scope Resolution Tag Buffer (SRTB), which is accessible to the cache controller 114 and/or the memory controller 104 shown in FIG. 1.

In one or more embodiments of the present invention, only the address and the metadata of a particular block of data are placed in SRTB, in order to minimize space and to minimize access latency.

In one or more embodiments of the present invention, information about an evicted block (identified to be heavily accessed in L2) will be placed in SRTB even if it is a clean block. As such, the block that is identified as heavily accessed is placed in L3 cache if evicted from the L2 cache.

Thereafter, if an L2 cache miss occurs, the SRTB is accessed. In one or more embodiments of the present invention, the SRTB is accessed in parallel with the L3 cache (since it is likely that the L3 cache will hold the evicted block of data). If the L3 cache does not hold the evicted block, then the metadata in the SRTB will show where the evicted block of data is actually located (e.g., L4 cache, system memory). However, since the SRTB is small, its access latency is much smaller than the L3 tag access. As such, even occasional cache misses in the L3 cache (when responding to an L2 cache miss) are much less time consuming overall than using an L3 tag access, in which all blocks in the L3 cache are examined by the cache controller 114 and/or the memory controller 104.

If the requested block is present in SRTB, the meta data is read to identify the location of the block. For example, if the cache miss occurred in the L2 cache 110, then the SRTB will show whether the evicted block (that caused the cache miss) is in L3 cache 112, L4 cache 106, or system memory 135. Thus, when the lookup to the SRTB is a hit, the cache controller 114 and/or the memory controller 104 will know the current location of the requested block (either in L3 cache 112 or L4 cache 106 or system memory 135) directly.

If the block is present in L3 cache 112, the access to L3 cache 112 is continued. If the block is present only in the system memory 135, the lookup to L3 cache 112 is cancelled and a request for the block is forwarded directly to system memory 135. This reduces the miss penalty time of the block.

As described herein, upon every access to the block, its access count tag value is incremented. In an embodiment of the present invention, all the values in the access count tag value are reset periodically so as to give priority to those most recently (and frequently) accessed blocks for eviction to the next level of cache, where they can be quickly retrieved and put back into the higher level of cache.

In an embodiment of the present invention, when a block is evicted from a cache such as L2 cache, the value of the access count tag is reset. The data block's current location (either in L3 or memory) is duly noted in the SRTB.

Eventually, when a block is evicted from L3 cache after being evicted from the L2 cache (invalidated in L3 cache if it is a clean block and written back to system memory if it is a modified block), the block's metadata in SRTB is updated. As described herein, the block's "in_L3" bit is reset and "in_mem" bit is set.

Figure 2:
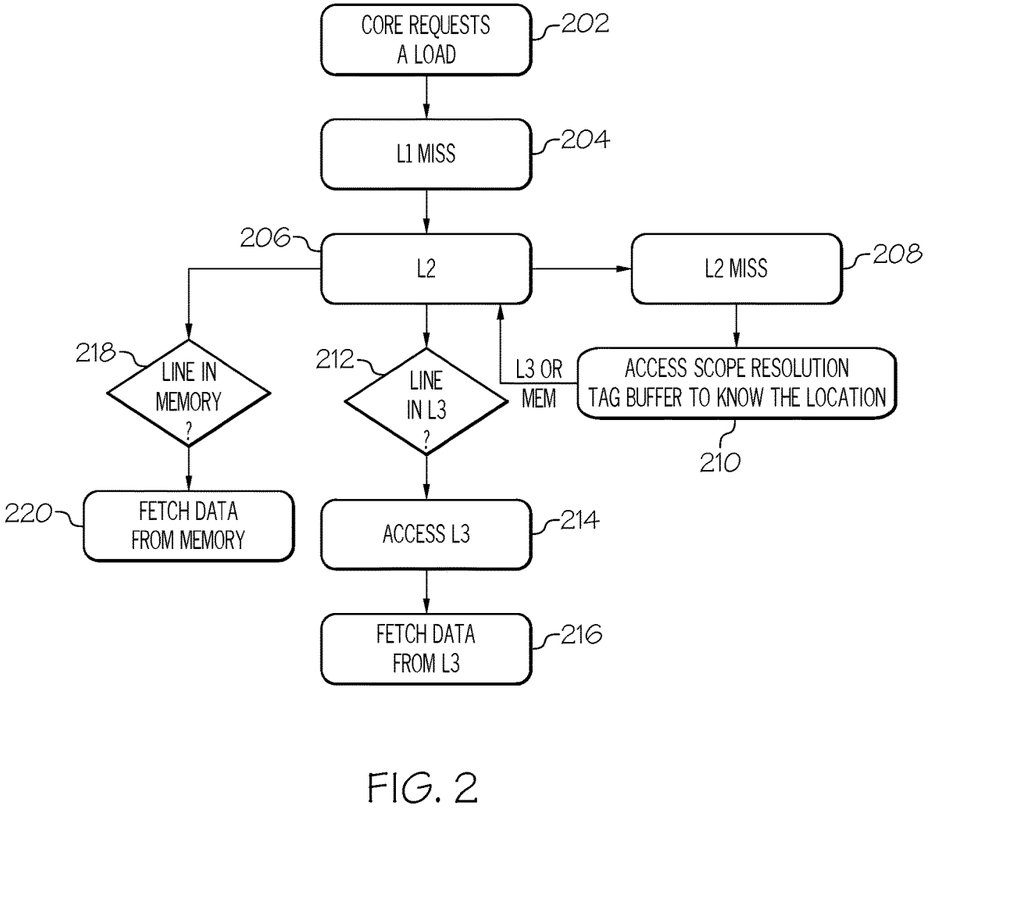
FIG. 2 illustrates a high level overview of one or more embodiments of the present invention.

With reference now to FIG. 2, a high level overview of one or more embodiments of the present invention is presented. As shown in block 202, a core (e.g., one of core(s) 102 shown in FIG. 1) requests a load (e.g., from L1 cache 108) of data/instructions to be used by an execution unit within the core. As shown in block 204, the requested data/instructions (i.e., "block") are not in the L1 cache, and thus, there is an L1 miss.

The cache controller (e.g., cache controller 114 and/or memory controller 104) then requests the block (data/instructions) from L2 cache (e.g., L2 cache 110 shown in FIG. 1), as shown in block 206.

As shown in block 208, L2 cache does not have the requested block, and thus there is an L2 miss.

The cache controller then accesses the Scope Resolution Tag Buffer (SRTB), which has a record of where the requested block is located, as shown in block 210.

This information is then returned to the memory controller. If there is no L4 cache, then the only two options are that the block is in L3 cache or else is in system memory. Thus, if the block is in L3 cache (query block 212), then the L3 cache is accessed (block 214) and the block of data is fetched from L3 cache (block 216). However, if the SRTB shows that the block/data is not in the L3 cache, then it is in system memory (query block 218), and the block/data is fetched from system memory (block 220).

Figure 3:
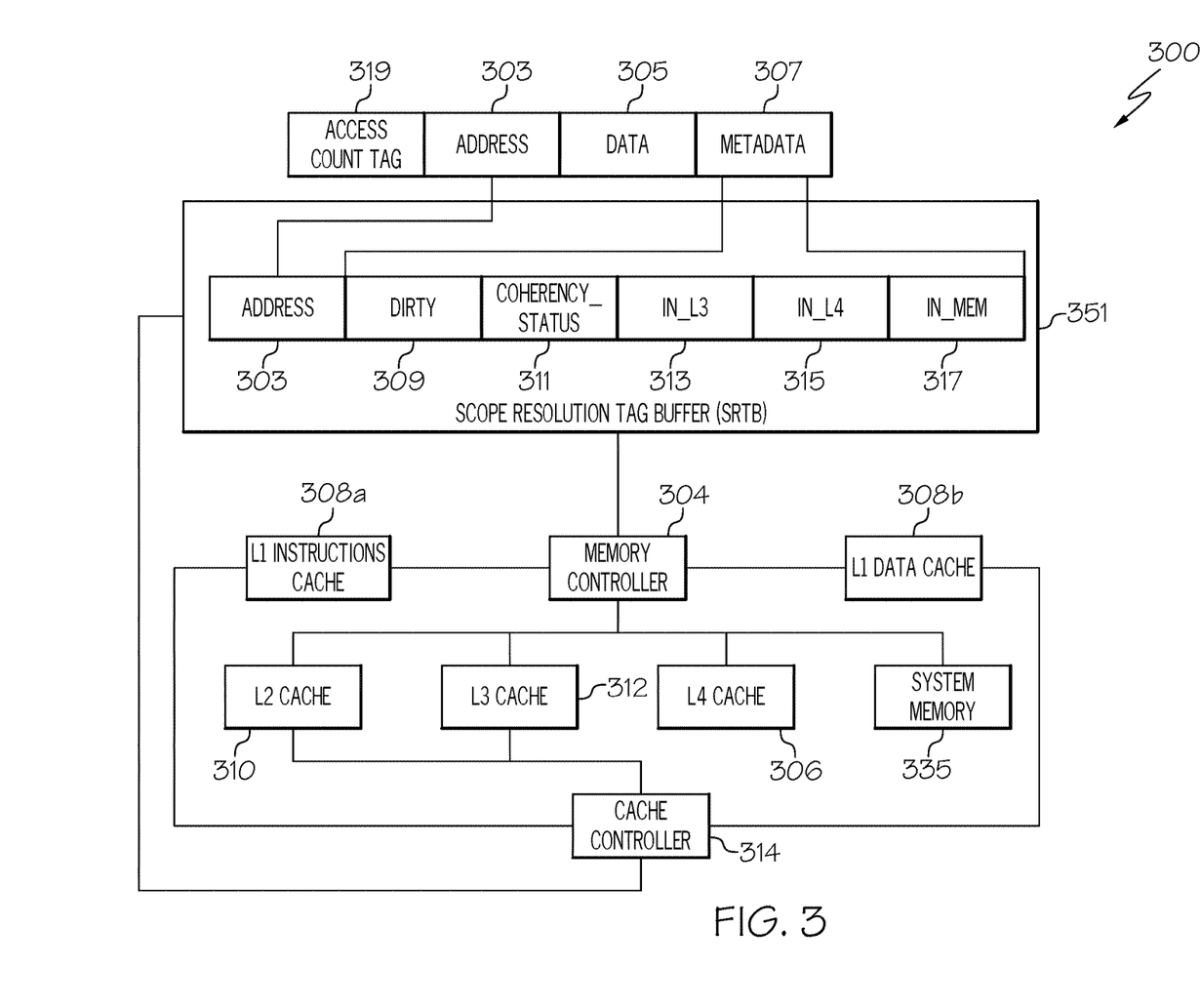
FIG. 3 depicts a memory controller and a cache controller coupled with multiple levels of cache/memory in accordance with one or more embodiments of the present invention.

FIG. 3 depicts a memory controller and a cache controller coupled with multiple levels of cache/memory in accordance with one or more embodiments of the present invention.

Assume for explanatory purposes that a block 300 (data or instructions) is initially stored in a certain cache, such as L2 cache 310 (analogous to L2 cache 110 shown in FIG. 1). Block 300 comprises four portions: access count tag 319; address 303; data 305; and metadata 307.

Access count tag 319, as described above, is a counter for how many times block 300 has been accessed (e.g., from L2 cache 310 by L1 data cache 308b).

Address 303 is the address of the block 300, as used in the caches and/or system memory.

Data 305 is the actual data (data or instructions) that is stored in the block 300.

Metadata 307 includes information that describes (e.g., using a single bit) whether or not the data 305 has been changed since being stored (e.g., in L2 cache 310), as shown in dirty block 309; a bit that describes whether or not the version of data 305 stored in other caches and/or system memory is the same as what is stored in the L2 cache, as shown in coherency_status block 311; a bit that describes whether or not block 300 is in L3 cache (e.g., L3 cache 312), as shown in "in-L3" block 313; a bit that describes whether or not block 300 is in L4 cache (e.g., L4 cache 306), as shown in "in-L4" block 315; and a bit that describes whether or not block 300 is in system memory (e.g., system memory 335), as shown in "in-mem" block 317. As shown in FIG. 3 and in one or more embodiments of the present invention, only the address 303 and the metadata 307 are stored in the SRTB 351 for each block 300.

In an embodiment of the present invention, SRTB 351 is a First In First Out (FIFO) buffer, where recent entries are enqueued by evicting the oldest entry in the queue. In an embodiment of the present invention, SRTB 351 uses an architecture that is similar to a Translation Lookaside Buffer (TLB) found in processor cores, which is made up of Content Addressable Memory (CAM) cells. That is, rather than searching the SRTB 351 by addresses of the buffer lines in the SRTB 351, the contents of the buffer lines are searched in parallel, thus providing a very fast return of a particular block address to the memory/cache controller. Thus, the memory/cache controller simply searches for the address of the block simultaneously from all cache lines in the SRTB 351 that has the CAM cells, making for a fast and easy direct lookup.

It is thus to be understood that the SRTB 351 is a FIFO buffer that handles multiple buffer lines of CAM cells, including the depicted buffer line shown as blocks 303, 309, 311, 313, 315, and 317. That is, each cache block that is described in the SRTB 351 will have its own set of 303, 309, 311, 313, 315, and 317 until the address 303 and metadata 307 in a particular buffer line is evicted from the SRTB 351 as well (based on the capacity of the FIFO buffer that makes up the SRTB 351.

While the SRTB 351 has been described as supporting L2 cache 310 (i.e., in order to handle cache misses in L2 cache 310), in various embodiments of the present invention a separate (or alternatively, a same) SRTB 351 is associated with L1 instructions cache 308a, L1 data cache 308b, and L3 cache 312. For example, if L3 cache 312 experiences a cache miss, then an SRTB 351 that is associated with L3 cache 312 will let the cache controller (cache controller 314 and/or memory controller 304) know whether the missed block is in L4 cache 306 or system memory 335. Thus, the SRTB can be placed after any level of cache, such that each of an L1 cache, an L2 cache, and/or an L3 cache has an SRTB associated with it.

As shown in FIG. 3, memory controller 304 (analogous to memory controller 104 shown in FIG. 1) and/or cache controller 314 (analogous to cache controller 114 shown in FIG. 1) have access to SRTB 351. In an embodiment, the memory controller 304 has control of L1 cache, including L1 instruction cache 308a and L1 data cache 308b with the core 102 shown in FIG. 1, as well as L2 cache 310 (analogous to L2 cache 110 shown in FIG. 1), L3 cache 312 (analogous to L3 cache 112 shown in FIG. 1), L4 cache 306 (analogous to L4 cache 106 shown in FIG. 1), and/or system memory 335 (analogous to system memory 135 shown in FIG. 1). In an embodiment, the cache controller 314 has control of L1 cache, including L1 instruction cache 308a and L1 data cache 308b with the core 102 shown in FIG. 1, as well as L2 cache 310 (analogous to L2 cache 110 shown in FIG. 1), and L3 cache 312 (analogous to L3 cache 112 shown in FIG. 1), but does not control L4 cache 306, (analogous to L4 cache 106 shown in FIG. 1), and/or system memory 335 (analogous to system memory 135 shown in FIG. 1). That is, in one embodiment, cache controller 114 first handles cache misses in L1 instruction cache 308a, L1 data cache 308b, L2 cache 310, and L3 cache 312, which is very fast due to the architecture and location of cache controller 114. However, if the cache miss still occurs in L3 cache 312, then the cache miss is turned over to memory controller 304, which handles the cache miss in L3 by accessing L4 cache 306 and/or system memory 335. However, in another embodiment, cache controller 314 is able to access and manage L1 instruction cache 308a, L1 data cache 308b, L2 cache 310, L3 cache 312, L4 cache 306, and system memory 335, just as memory controller 304 is able to do.

Figure 4:
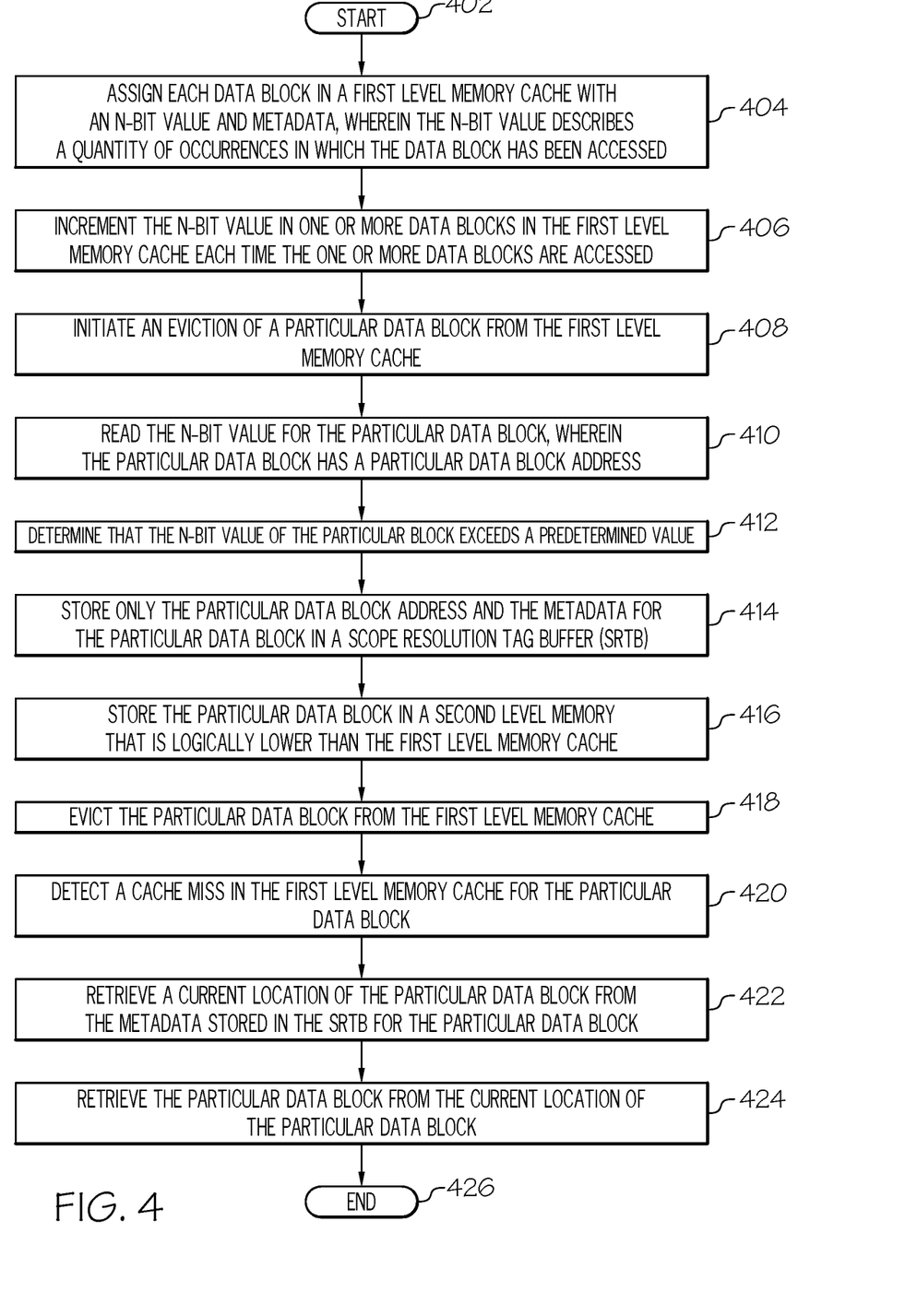
FIG. 4 is a high-level flow chart of one or more actions performed by a cache controller in accordance with one or more embodiments of the present invention.

FIG. 4 is a high-level flow chart of one or more actions performed by a cache controller in accordance with one or more embodiments of the present invention. The "cache controller" is the cache controller 114 shown in FIG. 1, or is the memory controller 104 shown in FIG. 1, or is a combination of the cache controller 114 and the memory controller 104. That is, a cache controller is defined as hardware logic that is able to control reads/writes/evictions/etc. in cache memory.

As shown in FIG. 4, after initiator block 402 a cache controller assigns each data block in a first level memory cache (e.g., L2 cache) with an n-bit value (e.g., the access count tag 319 shown in FIG. 3) and metadata (e.g., metadata 307 shown in FIG. 3), as described in block 404. For example, each block from L2 cache 310 shown in FIG. 3 is assigned an n-bit value (e.g., in the form of 2 bits), which describes a quantity of occurrences in which the data block has been accessed.

As described in block 406, the cache controller increments the n-bit value in one or more data blocks in the first level memory cache each time the one or more data blocks are accessed. That is, each time a particular block in a cache is accessed, the n-bit value is increased. Thus, every time a block from L2 cache 310 is accessed by L1 data cache 308b shown in FIG. 3, the "n-bit value" in the access count tag 319 is increased by 1, until the access count tag is saturated (e.g., is all "1's").

As described in block 408, the cache controller initiates an eviction of a particular data block (which in various embodiments is either actual data or an instruction) from the first level memory cache.

As described in block 410, in response to initiating the eviction of the particular data block from the first level memory cache, the cache controller reads the n-bit value for the particular data block. As shown in block 303 in FIG. 3, the particular data block also has a particular data block address.

As described in block 412, the cache controller determines that the n-bit value of the particular data block exceeds a predetermined value (e.g., if the n-bit value is 2 bits, then the predetermined value is "10" or "11" in an exemplary embodiment of the present invention).

In response to determining that the n-bit value of the particular data block exceeds the predetermined value, the cache controller: stores only the particular data block address and the metadata for the particular data block in a Scope Resolution Tag Buffer (SRTB), as described in block 414; and stores the particular data block in a second level memory (e.g., L3 cache 312) that is logically lower than the first level memory cache (e.g., L2 cache 310), as described in block 416.

As described in block 418, the cache controller then evicts the particular data block from the first level memory cache.

As described in block 420, the cache controller subsequently detects a cache miss in the first level memory cache for the particular data block.

As described in block 422, in response to detecting the cache miss in the first level memory cache for the particular data block, the cache controller retrieves a current location of the particular data block (e.g., in L3 cache, system memory, etc.) from the metadata stored in the SRTB for the particular data block.

As described in block 424, the cache controller then retrieves the particular data block from the current location of the particular data block.

The flow-chart ends at terminator block 426.

As described herein, in an embodiment of the present invention, the second level memory is a second level memory cache in a processor that is utilizing the first level memory cache. For example, and in one embodiment, the first level memory cache is L1 cache and the second level memory is L2 cache. For example, and in another embodiment, the first level memory cache is L2 cache and the second level memory is L3 cache.

As described herein, in an embodiment of the present invention, the second level memory is system memory for a processor that is utilizing the first level memory cache. For example, and in one embodiment, the first level memory cache is L2 cache and the second level memory is system memory. For example, and in another embodiment, the first level memory cache is L3 cache and the second level memory is system memory In an embodiment of the present invention, in response to the particular data block being evicted from the first level memory cache, the cache controller sets the n-bit value to 0. That is, once the block 300 shown in FIG. 3 is evicted (e.g., from L2 cache 310), the value of the n-bits in access count tag 319 are all reset to zero.

In an embodiment of the present invention, the n-bit value saturates with all values of the n-bit value being 1 in response to each block being accessed a quantity of times that is greater than $n^2-1$ within a predefined time period. That is, if block 300 shown in FIG. 3 has two bits in the access count tag 319, then when block 300 is accessed three times, the value of the n-bits in the access count tag 319 is "11". Thereafter, if block 300 is accessed again (without being evicted), the value of the n-bits in the access count tag 319 remains at "11" (i.e., it remains "saturated" at "11").

In an embodiment of the present invention, the cache controller resets all values of the n-bit value to 0 in response to the predefined time period being exceeded. That is, assume that block 300 has been in L2 cache 310 for longer than some predefined time period (e.g., ten minutes). If the 2-bit value in the access count tag 319 saturated to "11" within the first minute that block 300 was in L2 cache 310, but then was not accessed again for the next nine minutes, the cache controller would assume that block 300 is still being heavily accessed. In order to avoid this misunderstanding, the cache controller 314 will periodically (e.g., every ten minutes, or every ten seconds, etc.) restart the access count tag 319 by resetting the n-bit to zero.

In one or more embodiments of the present invention, requested blocks contains clean data that has not been modified. That is, the SRTB does not just contain information about "dirty" data (that has been modified since it was stored in the cache (e.g., L2 cache), but also contains information about clean data that has not been altered since being stored in the cache.

In an embodiment of the present invention, the first level memory cache is an L2 cache, the second level memory cache is an L3 cache, and the metadata for the particular data block includes a dirty tag that indicates whether the particular data block has been modified, a coherency tag that describes a coherency status of the particular data block between the L2 cache and other memory caches, an L3 tag that indicates whether the particular data block is currently in the L3 cache, an L4 tag that indicates whether the particular data block is currently in L4 cache, and a memory tag that indicates whether the particular data block is currently in system memory. (See FIG. 3.)

As described herein, the present invention (in the example of an L2 cache miss) identifies blocks to be placed in L3 by assigning each block in the L2 cache with an n-bit (e.g., where n=2) value. This n-bit value is associated with the block, along with the block's metadata in the L2 cache. The n-bit value is incremented (saturates at "11") whenever the block is accessed.

When a block is selected as a victim block, its n-bit value is read. If the value is greater than a predetermined value (e.g., is "10" or "11"), indicating that the block has been used a reasonable number of times, then it is placed in a special buffer described herein as a Scope Resolution Tag Buffer (SRTB).

In one or more embodiments of the present invention, only the address and the metadata for the evicted block are placed in the SRTB, in order to minimize space and improve the access latency.

In a preferred embodiment of the present invention, information of a block, identified to be heavily accessed in L2 cache, when evicted, will be placed in the SRTB even if it is a clean block.

A block, identified as heavily accessed, is thus placed in L3 cache.

Thereafter, upon an L2 cache miss, the SRTB is accessed in parallel with L3. Given that the SRTB is small, its access latency is much smaller than a prior art L3 tag access. If the requested block is present in SRTB, the metadata is read to identify the location of the block. When the lookup to SRTB is a hit, the system will know the current location of the requested block (either in L3 or Memory) directly. Thus, if the block is present in L3, the access to L3 is continued.

If the block is present only in system memory, the lookup to L3 is cancelled and the request is forwarded to memory directly. This reduces the miss penalty time of the block.

Upon every access to the block (e.g., in L2 cache), its n-bit value is incremented. In an embodiment of the present invention, all the n-bit values are reset periodically so as to tackle recency effect. That is, if a block is frequently accessed so that its n-bit value is saturated quickly during a set period of time, there is no way to determine whether it is still being accessed after the set period of time has passed. To ensure that the n-bit value saturation isn't "stale", the n-bit values are reset so that a current count of access frequency can be determined when a new period of time begins.

In an embodiment of the present invention, when evicted from a particular cache (e.g., L2 cache), the value of the n-bit is reset.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). It In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
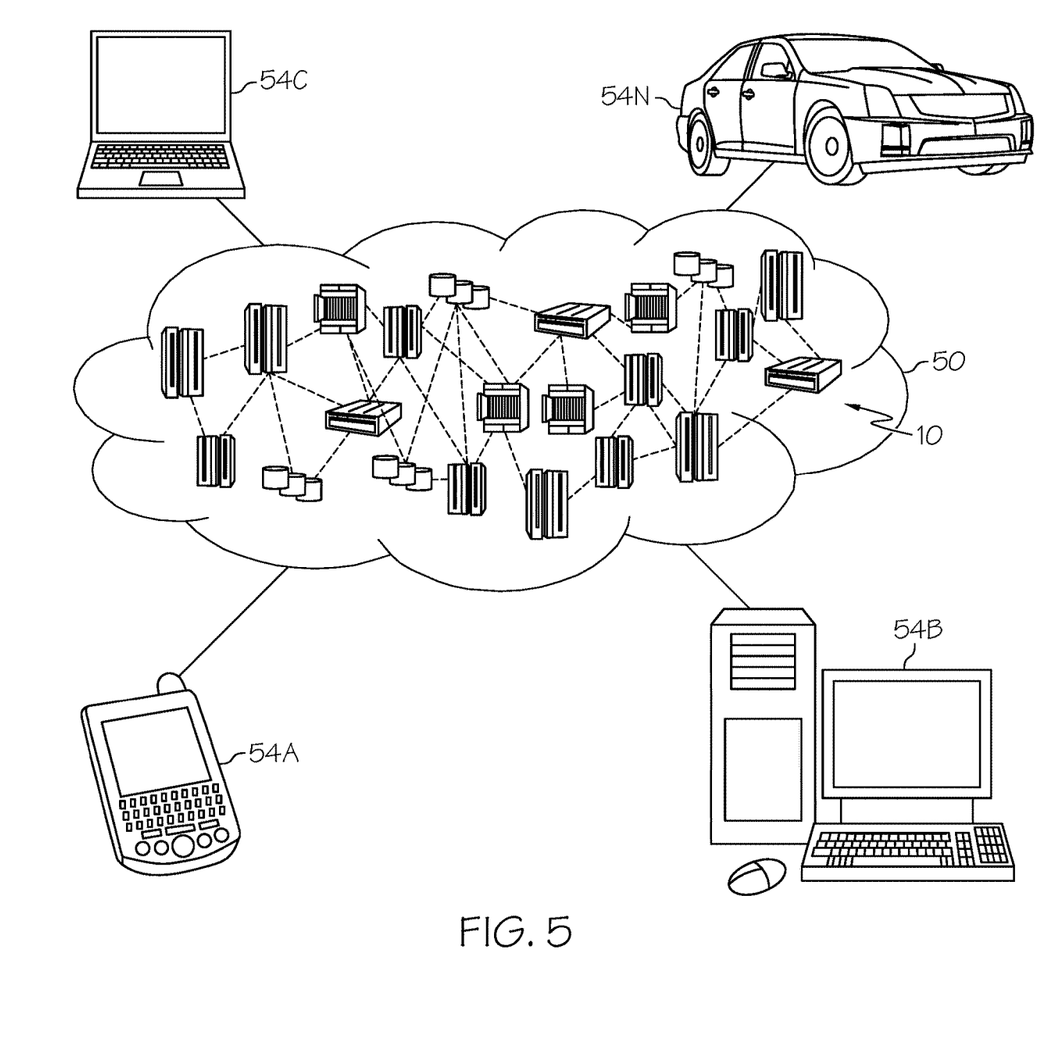
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
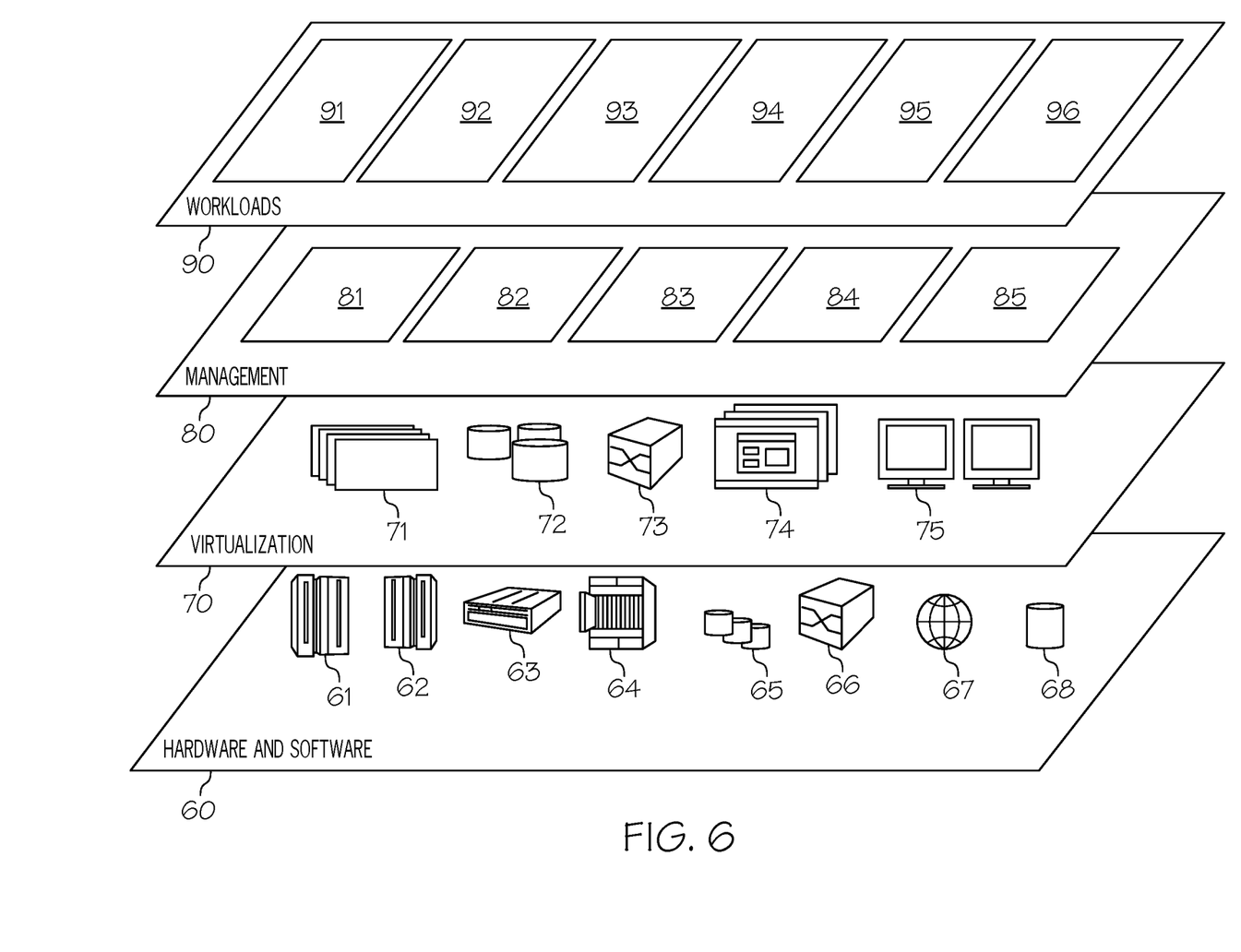
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and cache management processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    assigning, by a cache controller in a computer, each data block in a first level memory cache with an n-bit value and metadata, wherein the n-bit value describes a quantity of occurrences in which the data block has been accessed, and wherein the metadata describes a coherency status of the data block, a change status of the data block, and which cache device in the computer is currently storing the data block;
    incrementing, by the cache controller, the n-bit value in one or more data blocks in the first level memory cache each time the one or more data blocks are accessed;
    initiating, by the cache controller, an eviction of a particular data block from the first level memory cache;
    in response to initiating the eviction of the particular data block from the first level memory cache, reading, by the cache controller, the n-bit value for the particular data block, wherein the particular data block has a particular data block address;
    determining, by the cache controller, that the n-bit value of the particular data block exceeds a predetermined value;
    in response to determining that the n-bit value of the particular data block exceeds the predetermined value, the cache controller:
        storing only the particular data block address and the metadata for the particular data block in a Scope Resolution Tag Buffer (SRTB) that is accessible to both the cache controller and a system memory controller in the computer; and
        storing the particular data block in a second level memory that is lower in a cache and memory hierarchy than the first level memory cache.

2. The method of claim 1, further comprising:
    evicting, by the cache controller, the particular data block from the first level memory cache;
    detecting, by the cache controller, a cache miss in the first level memory cache for the particular data block;
    in response to detecting the cache miss in the first level memory cache for the particular data block, retrieving, by the cache controller, a current location of the particular data block from the metadata stored in the SRTB for the particular data block while accessing in parallel the second level memory cache; and
    retrieving, by the cache controller, the particular data block from the current location of the particular data block in the second level memory cache.

3. The method of claim 2, wherein the second level memory is a second level memory cache in a processor that is utilizing the first level memory cache.

4. The method of claim 2, wherein the second level memory is a system memory for a processor that is utilizing the first level memory cache.

5. The method of claim 2, further comprising:
    in response to the particular data block being evicted from the first level memory cache, setting, by the cache controller, the n-bit value to 0.

6. The method of claim 2, wherein the n-bit value saturates with all values of the n-bit value being 1 in response to the each block being accessed a quantity of times that is greater than $n^2-1$ within a predefined time period.

7. The method of claim 6, further comprising:
    resetting, by the cache controller, all values of the n-bit value to 0 in response to the predefined time period being exceeded.

8. The method of claim 2, wherein the requested block contains clean data that has not been modified.

9. The method of claim 1, wherein the cache controller is within a processor in the computer, wherein the first level memory cache is an L1 instruction cache within a processor core in the processor, and wherein the second level memory cache is an L2 cache within the processor core.

10. A computer program product comprising a non-transitory computer readable storage device having program instructions embodied therewith, the program instructions readable and executable by a computer to perform a method comprising:

assigning each data block in a first level memory cache with an n-bit value and metadata, wherein the n-bit value describes a quantity of occurrences in which the data block has been accessed, and wherein the metadata describes a coherency status of the data block, a change status of the data block, and which cache device in the computer is currently storing the data block;

incrementing the n-bit value in one or more data blocks in the first level memory cache each time the one or more data blocks are accessed;

initiating an eviction of a particular data block from the first level memory cache;

in response to initiating the eviction of the particular data block from the first level memory cache, reading the n-bit value for the particular data block, wherein the particular data block has a particular data block address;

determining that the n-bit value of the particular data block exceeds a predetermined value;

in response to determining that the n-bit value of the particular data block exceeds the predetermined value:
storing only the particular data block address and the metadata for the particular data block in a Scope Resolution Tag Buffer (SRTB) that is accessible to both a cache controller and a system memory controller in the computer; and
storing the particular data block in a second level memory that is lower in a cache and memory hierarchy than the first level memory cache;

evicting the particular data block from the first level memory cache;

detecting a cache miss in the first level memory cache for the particular data block;

in response to detecting the cache miss in the first level memory cache for the particular data block, retrieving a current location of the particular data block from the metadata stored in the SRTB for the particular data block; and retrieving the particular data block from the current location of the particular data block.

11. The computer program product of claim 10, wherein the second level memory is a second level memory cache in a processor that is utilizing the first level memory cache.

12. The computer program product of claim 10, wherein the method further comprises:
in response to the particular data block being evicted from the first level memory cache, setting the n-bit value to 0.

13. The computer program product of claim 10, wherein the n-bit value saturates with all values of the n-bit value being 1 in response to the each block being accessed a quantity of times that is greater than $n^2-1$ within a predefined time period.

14. The computer program product of claim 13, further comprising:
resetting all values of the n-bit value to 0 in response to the predefined time period being exceeded.

15. The computer program product of claim 10, wherein the requested block contains clean data that has not been modified.

16. The computer program product of claim 10, wherein the cache controller is within a processor in the computer, wherein the first level memory cache is an L1 instruction cache within a processor core in the processor, and wherein the second level memory cache is an L2 cache within the processor core.

17. The computer program product of claim 10, wherein the program instructions are provided as a service in a cloud environment.

18. A computer system comprising one or more processors, one or more computer readable memories, one or more computer readable storage mediums, and program instructions stored on at least one of the one or more computer readable storage mediums for execution by at least one of the one or more processors via at least one of the one or more computer readable storage memories to perform a method comprising:

assigning each data block in a first level memory cache with an n-bit value and metadata, wherein the n-bit value describes a quantity of occurrences in which the data block has been accessed, and wherein the metadata describes a coherency status of the data block, a change status of the data block, and which cache device in the computer is currently storing the data block;

incrementing the n-bit value in one or more data blocks in the first level memory cache each time the one or more data blocks are accessed;

initiating an eviction of a particular data block from the first level memory cache;

in response to initiating the eviction of the particular data block from the first level memory cache, reading the n-bit value for the particular data block, wherein the particular data block has a particular data block address;

determining that the n-bit value of the particular data block exceeds a predetermined value;

in response to determining that the n-bit value of the particular data block exceeds the predetermined value:
storing only the particular data block address and the metadata for the particular data block in a Scope Resolution Tag Buffer (SRTB) that is accessible to both a cache controller and a system memory controller in the computer; and
storing the particular data block in a second level memory that is lower in a cache and memory hierarchy than the first level memory cache;

evicting the particular data block from the first level memory cache;

detecting a cache miss in the first level memory cache for the particular data block;

in response to detecting the cache miss in the first level memory cache for the particular data block, retrieving a current location of the particular data block from the metadata stored in the SRTB for the particular data block; and retrieving the particular data block from the current location of the particular data block;

evicting the particular data block from the first level memory cache;

detecting a cache miss in the first level memory cache for the particular data block;

in response to detecting the cache miss in the first level memory cache for the particular data block, retrieving a current location of the particular data block from the metadata stored in the SRTB for the particular data block; and retrieving the particular data block from the current location of the particular data block.

19. The computer system of claim 18, wherein the cache controller is within a processor in the computer, wherein the first level memory cache is an L1 data cache within a processor core in the processor, and wherein the second level memory cache is an L2 cache within the processor core.

20. The computer system of claim 18, wherein the program instructions are provided as a service in a cloud environment.

* * * * *